O. H. & A. F. PIEPER.
ROTARY CONVERTER.
APPLICATION FILED JULY 9, 1913.

1,172,630.

Patented Feb. 22, 1916.

Witnesses
Nelson H. Copp
Walter D. Payne

Inventors
Oscar H. Pieper
Alphonse F. Pieper

By
their Attorneys

THE COLUMBIA PLANOGRAPH CO., WASHINGTON, D. C.

UNITED STATES PATENT OFFICE.

OSCAR H. PIEPER AND ALPHONSE F. PIEPER, OF ROCHESTER, NEW YORK.

ROTARY CONVERTER.

1,172,630.      Specification of Letters Patent.      Patented Feb. 22, 1916.

Application filed July 9, 1913. Serial No. 778,037.

*To all whom it may concern:*

Be it known that we, OSCAR H. PIEPER and ALPHONSE F. PIEPER, both of the city of Rochester, in the county of Monroe and State of New York, have invented certain new and useful Improvements in Rotary Converters; and we do hereby declare the following to be a full, clear, and exact description of the same, reference being had to the accompanying drawings, forming a part of this specification, and to the reference-numerals marked thereon.

Our invention relates to rotary converters or transformers, and it has for its principal object to provide a mechanism that will be automatical in its operation, in that it obviates the necessity of a manually controlled device for holding open the outgoing circuit until the armature has attained proper speed, said circuit being automatically closed and opened, thus affording an apparatus of great efficiency, and one which is fully protected against the dangers arising from the present forms of converters, especially when in the hands of inexperienced operators.

To these and other ends the invention consists in certain improvements and combinations of parts, all as will be hereinafter more fully described, the novel features being pointed out in the claim at the end of the specification.

Figure 1:
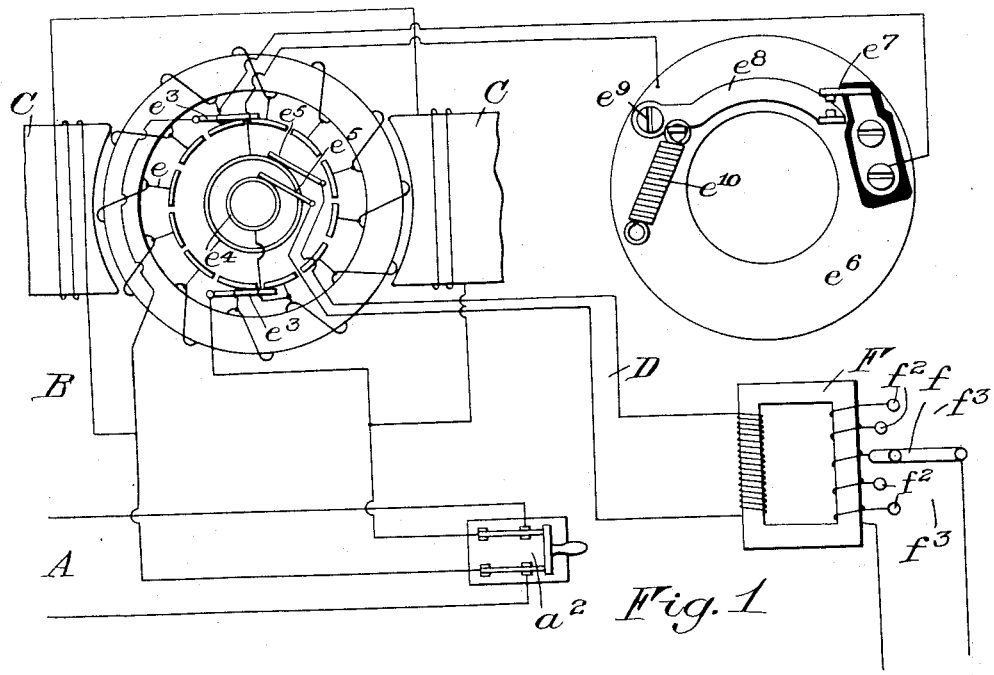
Figure 2:
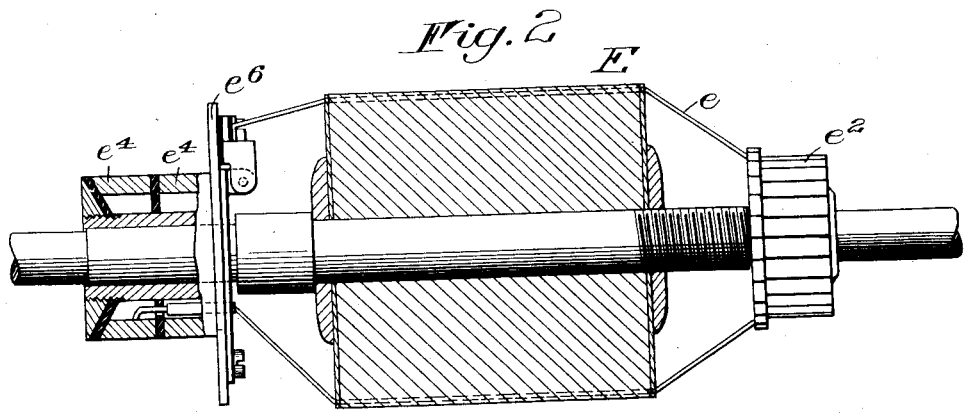

In the drawings: Figure 1 is a diagrammatic view illustrating a preferred embodiment of our invention, in its application to a known type of converter, and Fig. 2 is a vertical sectional view of the armature.

Similar reference numerals throughout the several figures indicate the same parts.

The invention is susceptible of various applications, and is particularly useful in places where a direct current is available and it is desired to use an alternating current of reduced voltage. It is desirable to have the entire apparatus under the control of a single switch, since in machines of this type as heretofore constructed, it has been necessary to employ two switches, one for first closing the incoming circuit, and another for subsequently closing the outgoing circuit after the armature has reached sufficient speed. If the armature is not up to normal speed when the outgoing circuit is closed, there will be more or less of a short circuit through the latter, resulting in serious sparking between the commutator bars and the brushes in contact therewith. This is overcome in our present arrangement by employing a single manually controlled switch which closes the incoming circuit, and an automatic switch for controlling the outgoing circuit, the latter being governed in its opening and closing movements by the speed of the armature, and serving to maintain the outgoing circuit open until the armature has attained high enough speed to prevent the effects referred to.

In the embodiment disclosed in the present illustration of the invention, A designates the direct current circuit, which in the present instance, is the incoming circuit, controlled by a manually operated switch $a^2$.

B is the shunt field circuit, C are the field magnets, and D is the outgoing or alternating current circuit.

The armature is designated generally at E, and is provided with windings $e$ and commutator bars $e^2$ which contact with the brushes $e^3$. The opposite end of the armature is provided with collecting rings $e^4$, which contact with the brushes $e^5$, and are suitably connected with the windings, as shown in Fig. 1.

Arranged in series with the alternating current circuit is a switch adapted to be controlled by the speed of the armature, and to this end, there is mounted on the armature shaft a plate $e^6$ which carries a stationary contact member $a^7$ and a movable contact member $e^8$, pivoted at $e^9$ and held normally away from the stationary contact $e^7$ by means of the spring $e^{10}$. When the contacts $e^7$ and $e^8$ are in engagement, the parts are so connected, as shown in Fig. 1, that a circuit is completed between the commutator bars and the collecting rings, causing an alternating current to flow through the outgoing circuit. It will be observed that the contact member $e^8$ is, under normal conditions, held away from the stationary contact $e^7$ and remains in such position until the speed of the armature is sufficient to throw the contact member $e^8$ outwardly by centrifugal force, against the action of the spring $e^{10}$, and thereby closes the circuit. In order to start the machine in operation, it is only necessary to close the switch $a^2$. This furnishes a direct current to the armature windings and field coils and starts the armature, and the speed of the latter serves automatically to close the outgoing circuit when it reaches a predetermined point.

For the ordinary purposes for which the present machine is designed, the derived current is of a higher voltage than required and it often becomes desirable to reduce the voltage of the alternating current in the outgoing circuit. To this end, we prefer to employ a stationary transformer F, disposed in the circuit D and controlled by the switch $f$ which coöperates with the contacts $f^2$ and is limited in its movement by the stops $f^3$.

While we have disclosed in the present application a specific construction embodying our invention, we do not limit ourselves to the arrangement set forth, as we believe it to be new to construct a converter having one of its circuits controlled by an automatically governed switch which is actuated by the movement of the armature, and we intend to cover by this application any modifications of the structure disclosed, that may come within the terms of the claim hereinafter, and the scope of the invention as defined.

We claim as our invention:

In a rotary converter, the combination with an armature having an ingoing direct current conductor and an outgoing alternating current conductor, of a speed controlled switch carried by the armature and arranged in series with the alternating current conductor, operating to open and close the alternating current circuit automatically in accordance with the speed of the armature, as determined by the direct current circuit.

OSCAR H. PIEPER.
ALPHONSE F. PIEPER.

Witnesses to signature of Oscar H. Pieper:
RUSSELL B. GRIFFITH,
WALTER B. PAYNE.

Witnesses to signature of Alphonse F. Pieper:
C. A. YOUNGBERG,
O. A. BRASLAU.

Copies of this patent may be obtained for five cents each, by addressing the "Commissioner of Patents, Washington, D. C."